P. MACCO.
PEA HARVESTER.
APPLICATION FILED NOV. 6, 1912.
1,105,445.
Patented July 28, 1914.
2 SHEETS—SHEET 1.
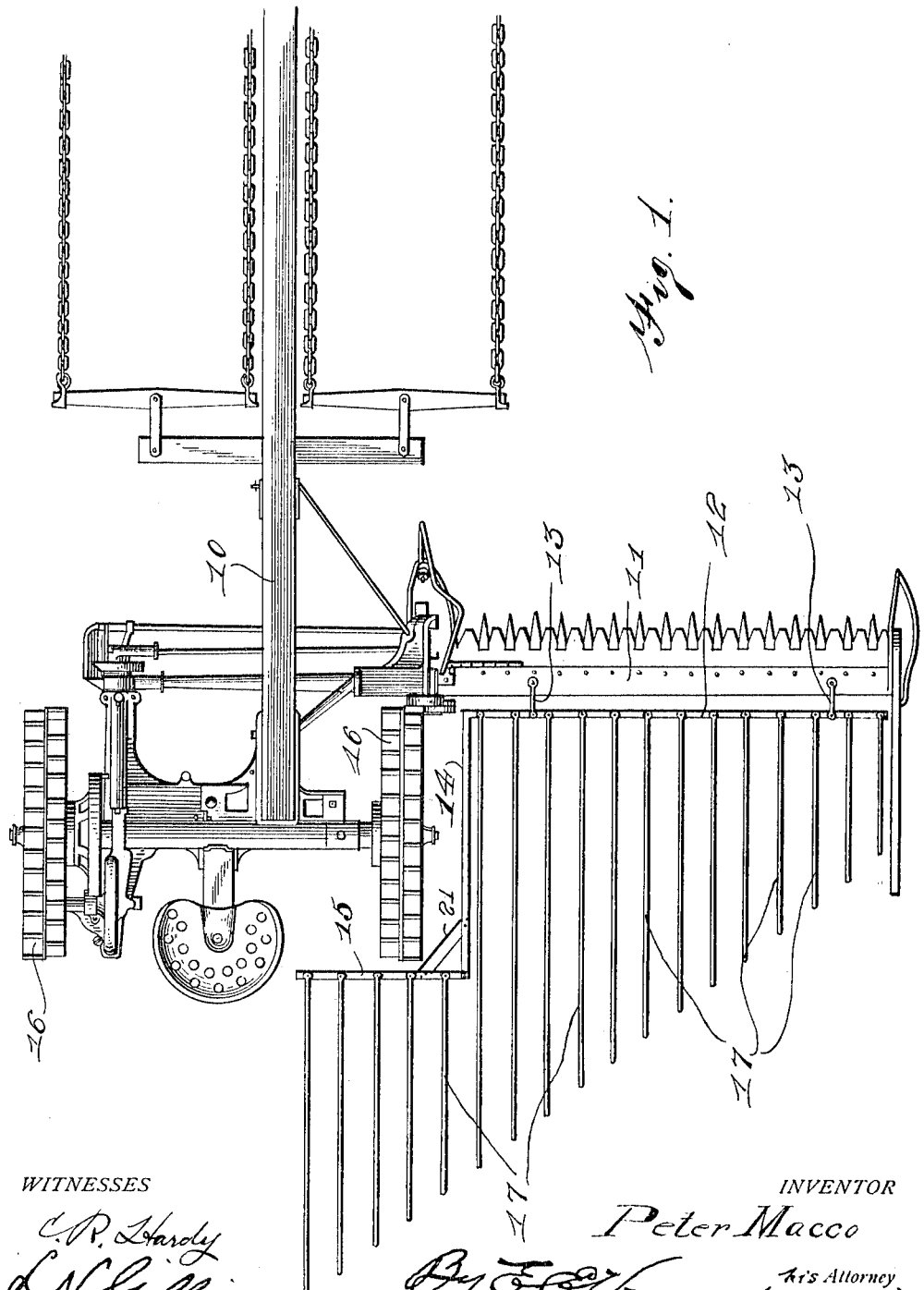

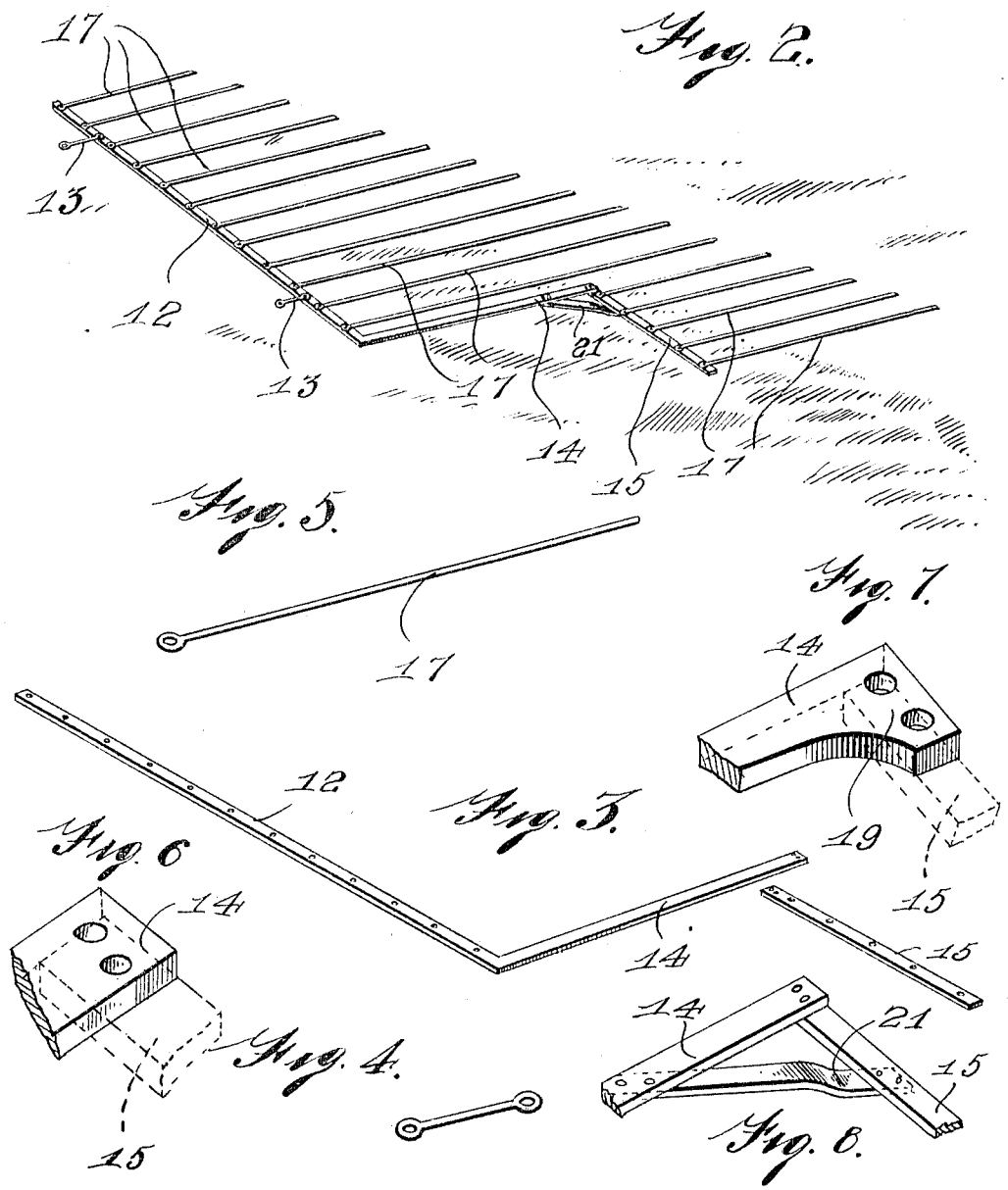

UNITED STATES PATENT OFFICE.

PETER MACCO, OF CARNEY, MICHIGAN.

PEA-HARVESTER.

1,105,445.  Specification of Letters Patent.  Patented July 28, 1914.

Application filed November 6, 1912. Serial No. 729,810.

*To all whom it may concern:*

Be it known that I, PETER MACCO, a citizen of the United States, residing at Carney, in the county of Menominee and State of Michigan, have invented certain new and useful Improvements in Pea-Harvesters, of which the following is a specification, reference being had therein to the accompanying drawing.

This invention relates to harvesters and has special reference to an attachment for a harvester to enable them to harvest peas and the like.

The principal object of the invention is to provide a simple and efficient device which may be readily applied to any existing harvester of the type commonly used in mowing grass and the like.

With the above and other objects in view, this invention consists in general of certain novel details of construction, combinations and arrangements of parts, as will be hereinafter fully described, illustrated in the accompanying drawings, and specifically claimed.

In the accompanying drawings, like characters of reference indicate like parts in the several views, and: Figure 1 is a plan view showing the device applied to a harvester. Fig. 2 is a perspective detail showing the device detached from the harvester. Fig. 3 is a perspective detail showing the frame of the device. Fig. 4 is a perspective view of one of the links used to attach the device to the cutter bar of the harvester. Fig. 5 is a perspective view of one of the teeth of the device. Fig. 6 is a perspective detail of one form of joint in the frame. Fig. 7 is a perspective detail of a modified form of frame joint. Fig. 8 is a perspective detail of a second modification of the frame joint.

In carrying out the objects of this invention and in the present disclosure, there is shown a harvester or mower 10 of the ordinary form which is provided with the usual cutter bar 11 detachable from the device comprising a frame consisting of a member 12 which is secured to the cutter bar 11 by links 13 pivotally bolted both to the frame and the cutter bar. Extending rearwardly from this member 11 is a member 14 which is preferably formed integrally with the inner end of the member 11 and secured to the rear end of the member 14 is a member 15 which runs parallel to the member 12 and extends behind the wheel 16 which is nearest the cutter bar 11. Pivotally bolted to the members 12 and 15 are the teeth 17 each of which is provided with the usual hooked end 18, and these ends are so arranged as to lie diagonally in series with reference to the cutter bar 11. That is to say, the teeth 17 are graduated in length in such a manner that their hook ends 18 extend successively farther back from the outer end of the sickle bar than the last tooth beyond the wheel. The joint between the members 14 and 15 may either be as disclosed in Fig. 6, or the rear end of the member 14 may be broadened as at 19 to form a brace, or a brace 20 may be secured to the member 14 and bent downwardly as at 21, to engage the member 15.

In using the device the machine is driven through the field in the usual manner, and the knives of the cutter bar will cut down the material while the rake formed by the teeth 17 and the hook ends 18 will gather the same up, it being observed that the tendency is to deposit material immediately behind the horses owing to the successive length of the teeth 17.

There has thus been provided a simple and efficient device of the kind described, and for the purpose specified.

Having thus described the invention, what is claimed as new, is:—

A mowing machine attachment comprising a perforated strip extending parallel to the sickle bar of the mower and having a bar extending from its inner end to a point beyond the wheels of the mower, a perforated strip connected with the rear end of said arm and extending partially across the rear portion of the mowing machine, a diagonal bracing strip connecting said arm and last mentioned perforated strip, links carried by said first mentioned perforated strip to connect the same with the sickle bar of a mower, and a plurality of teeth connected with said perforated strips.

In testimony whereof I hereunto affix my signature in presence of two witnesses.

PETER MACCO.

Witnesses:
HOWARD E. NADEAU,
LOLETA SANFORD.

Copies of this patent may be obtained for five cents each, by addressing the "Commissioner of Patents, Washington, D. C."